United States Patent [19]
Kuckro

[11] Patent Number: 6,096,816
[45] Date of Patent: *Aug. 1, 2000

[54] FLAME RETARDANT COMPOSITION

[75] Inventor: Gerard W. Kuckro, Cincinnati, Ohio

[73] Assignee: Gerard Kuckro, Cincinnati, Ohio

[*] Notice: This patent is subject to a terminal disclaimer.

[21] Appl. No.: 09/008,852

[22] Filed: Jan. 19, 1998

Related U.S. Application Data

[63] Continuation-in-part of application No. 08/905,871, Aug. 4, 1997, Pat. No. 5,710,202, which is a continuation of application No. 08/582,363, Jan. 5, 1996, abandoned.

[51] Int. Cl.⁷ .................... C08K 3/38; C08K 5/09
[52] U.S. Cl. .................... 524/405; 524/404; 524/321; 524/399; 524/425; 524/437; 524/450; 524/524; 524/563
[58] Field of Search ............... 524/405, 404, 524/321, 399, 437, 425, 450, 524, 563

[56] References Cited

U.S. PATENT DOCUMENTS

| | | |
|---|---|---|
| 3,832,326 | 8/1974 | North et al. . |
| 3,922,442 | 11/1975 | North et al. . |
| 4,349,605 | 9/1982 | Biggs et al. . |
| 4,381,362 | 4/1983 | Biggs et al. . |
| 4,409,342 | 10/1983 | Ancker et al. . |
| 4,801,639 | 1/1989 | Hoshi et al. . |
| 5,034,056 | 7/1991 | von Bonin . |
| 5,118,748 | 6/1992 | Toshinori et al. . |
| 5,412,012 | 5/1995 | Horwatt et al. . |
| 5,480,587 | 1/1996 | Mosselman et al. . |

FOREIGN PATENT DOCUMENTS

| | | |
|---|---|---|
| 145213 | 6/1985 | European Pat. Off. . |
| 61-213241 | 9/1986 | Japan . |

*Primary Examiner*—Mark L. Warzel
*Attorney, Agent, or Firm*—Killworth, Gottman, Hagan & Schaeff LLP

[57] ABSTRACT

A flame retardant composition is provided which is less expensive to produce than prior compositions and yet which exhibits desirable insulation properties, flame and fire resistance, and which, when ignited, does not emit noxious smoke or corrosive gases. The crosslinkable flame retardant composition includes a crosslinkable polymer, a hydrated inorganic filler, and a coupling agent which is an acid having at least two active carboxylic acid groups.

21 Claims, No Drawings

FLAME RETARDANT COMPOSITION

CROSS REFERENCE TO RELATED APPLICATIONS

This application is a continuation-in-part of U.S. application Ser. No. 08/905,871, filed Aug. 4, 1997, now U.S. Pat. No. 5,710,202, issued Jan. 20, 1998, which application was a file-wrapper-continuing application of U.S. application Ser. No. 08/582,363, filed Jan. 5, 1996, now abandoned. The subject matter of these applications is hereby incorporated by reference.

BACKGROUND OF THE INVENTION

This invention relates to an improved polymeric composition which is crosslinked to produce flame and heat resistant products for both electrical and nonelectrical uses. More particularly, the invention relates to a crosslinkable flame retardant polymer containing a novel coupling agent and inorganic hydrate filler.

Fire resistant compositions are widely used for wire and cable insulation, among other uses. In electrical environments, both insulating and flame resistant properties are essential. That is, the compositions when ignited should not exhibit after glow, should not emit noxious or toxic smoke, and should promote the formation of an inorganic char which is both non-combustible and non-toxic. Additionally, the compositions desirably should not deteriorate over long service times.

In some instances, the manufacture of extrudable fire resistant compositions requires the use of halogenated polymers such as chlorinated polyethylene, chlorosulfonated polyethylene, polyvinyl chloride, and chlorobutadiene, or coatings of chlorinated polymers over other polymer compositions. However, in fire situations, such chlorinated compositions evolve toxic hydrogen chloride gas and emit large quantities of noxious smoke. As smoke inhalation is an even greater cause of death in fires than the fire itself, such products are unsuitable. Further, hydrogen chloride gas is a highly corrosive gas which is converted quickly into hydrochloric acid in the presence of any water. Exposure to hydrochloric acid will damage or destroy electrical equipment such as computers, switchboards, printed circuits, and the like.

One widely used fire retarding insulation product has been a crosslinkable copolymer of ethylene and vinyl acetate, one or more hydrated inorganic fillers, one or more silane coupling agents, and a crosslinking agent (typically an organic peroxide). Such a product is taught in North and Kuckro, U.S. Pat. Nos. 3,832,326 and 3,922,442. Similar products are also taught in Biggs et al, U.S. Pat. Nos. 4,349,605 and 4,381,362. Compositions of this type are used as fire retardant insulation and jacketing for copper and aluminum conductors and in instrument transformers. The products exhibit good processability and meet SAE J-1128 low tension primary cable standards.

One problem with the manufacture of these crosslinkable polymers has been the need for the use of relatively expensive silane coupling agents. Such silanes are required to provide compatibility between the polymer and inorganic fillers so that a well-dispersed, homogeneous composition will be produced.

Accordingly, there still exists a need in this art for an inexpensive flame and heat resistant polymer composition which also provides electrical insulating properties and which, when ignited, does not emit noxious smoke or corrosive gases.

SUMMARY OF THE INVENTION

The present invention meets that need by providing a flame retardant composition which is less expensive to produce than prior compositions and yet which exhibits desirable insulation properties, flame and fire resistance, and which, when ignited, does not emit noxious smoke or corrosive gases. In accordance with one aspect of the present invention, a crosslinkable flame retardant composition is provided and includes a polymer, a hydrated inorganic filler, and a coupling agent. The composition may be crosslinked (vulcanized) to a final form.

The coupling agent comprises a compound which includes at least two active carboxylic acid (COOH) groups. For example, the coupling agent may be a dicarboxylic acid such as oxalic acid or adipic acid. The carboxylic acids are preferred as these compositions are readily available and inexpensive relative to the cost of conventional vinyl silane coupling agents (i.e., on the order of one-tenth the per pound cost). Thus, the present invention contemplates that the crosslinkable composition will be free of silanes.

The preferred hydrated inorganic filler for use in the present invention, comprises calcium borate pentahydrate, although other hydrated compositions and mixtures of hydrated compositions may be utilized including hydrated zinc borate. The calcium borate pentahydrate has the advantage of having five moles of chemically bound water and imparts desirable flame and smoke characteristics to the composition.

Chemical crosslinking of the composition may be accomplished in a number of conventional ways. For example, a chemical crosslinking agent may included in the composition and may comprise any of a number of conventional agents used in the art including organic peroxides. Alternatively, radiation or other non-chemical means may be used to crosslink the composition.

The compositions of the present invention find particular use as insulation for building wire, appliance wire, switchboard wire, and automotive wire where the combination of superior electrical properties, flame resistance, and low smoke evolution are desired. Additionally, the compositions of the present invention may also find use in non-electrical environments where flame resistance is desired such as for the fabrication of shower stalls and booths for residential and commercial uses and the manufacture of trays and containers for use in schools, aircraft, factories, and other commercial installations.

Accordingly, it is a feature of the present invention to provide a flame retardant composition which is less expensive to produce than prior compositions and yet which exhibits desirable insulation properties, flame and fire resistance, and which, when ignited, does not emit noxious smoke or corrosive gases. This, and other features and advantages of the present invention will become apparent from the following detailed description and accompanying claims.

DETAILED DESCRIPTION OF THE PREFERRED EMBODIMENTS

The novel flame retardant compositions of the present invention are comprised of three basic components: (1) one or more crosslinkable polymers; (2) a hydrated inorganic filler; and (3) a coupling agent comprising a compound having at least two active carboxylic acid groups. Preferably, the composition also includes a crosslinking agent, such as an organic peroxide, and an antioxidant. Preferably, the composition is silane and halogen-free.

The Polymer Component

The crosslinkable polymer component of the present invention may be any of the copolymers described in North et al, U.S. Pat. No. 3,832,326, the disclosure of which is incorporated by reference. Other classes of polymers which are useful in the practice of the present invention include acetals, acrylics, acrylonitrile-styrene-butadiene (ABS), Nylons, polycarbonate, thermoplastic polyesters, polyethylene, polypropylene, polystyrene, polyvinyl chloride, epoxy, phenolic, and polyurethane. When using the terms crosslinkable and crosslinking, the normal art recognized meaning of those terms is meant. Further, the composition may include compatible blends of these polymers. However, the polymers should be free of silanes, including grafted silane groups.

A preferred polymer composition is a copolymer of ethylene and vinyl acetate, wherein the vinyl acetate content of the copolymer is between about 6 and 38%. Lesser percentages of vinyl acetate in the copolymer result in a composition which is more difficult to process and which possesses less flame resistance. Preferably, the copolymers have a melt index of from about 1.0 to 10.0, and most preferably between about 1.0 and 2.0.

Crosslinking of the polymer component may be accomplished by any of several known procedures in the art. For example, crosslinking may be induced by the use of chemical crosslinking agents, by exposing the composition to radiation, or by thermal crosslinking. A preferred method for crosslinking the polymer is the use of organic peroxide crosslinking agents which are well known in the art. Typically, from about 1 to 8 parts by weight crosslinking agent per 100 parts polymer has been found to be suitable. I have found that one can advantageously incorporate two organic peroxide crosslinking agents (each with a different decomposition temperature) into the composition to provide a faster rate of crosslinking while avoiding scorching of the polymer or premature crosslinking.

In general, the higher the degree of crosslinking, the more resistant the polymer is to moisture and chemical reagents and the less resistant the composition is to abrasion. At lower degrees of crosslinking, there is also some loss of heat resistance as well as an effect on elongation after ageing. The exact degree of crosslinking can be varied to optimize the composition for a particular desired end use. For example, for use as a wire or cable insulation, a crosslinking percentage on the order of about 95% is preferred, with the degree of crosslinking being measurable by art recognized methods.

The Coupling Agent Component

Prior art compositions have required the use of relatively expensive vinyl and/or alkoxy silane coupling agents to achieve the desired properties of flame and heat resistance coupled with good electrical and mechanical properties. North et al, U.S. Pat. No. 3,832,326, teach that if the silane coupling agent is omitted, an inexplicable lowering of tensile strength and percent retention of elongation after ageing results. I have discovered that these relatively expensive silane coupling agents may be replaced by one or more compounds containing at least two carboxylic acid groups in the flame retardant composition without adversely affecting the desired balance of properties of the composition.

I have found that such commonly available dicarboxylic acids such as oxalic acid and adipic acid can be used to partially or totally replace the prior art silanes. The carboxylic acids also act to disperse the inorganic filler with the polymer to provide a homogeneous mixture.

Generally, I have found that the use of from about 0.25 to about 5 parts by weight coupling agent per 100 parts polymer are suitable. Because the cost of dicarboxylic acids is approximately one-tenth that of commercially available vinyl silanes, it is desirable to use these acids as the coupling agents to replace the silanes either partially or totally. However, in some instances, the combination of the two different coupling agents produce synergistic results in the properties of the crosslinked product. Further, while certain salts of saturated fatty acids such as stearates have been used in the past in crosslinkable flame retardant compositions as lubricants to improve the stripping properties of wire insulation, I use the acid form of the compositions and have unexpectedly found that they function quite well as coupling agents in the composition.

The Hydrated Inorganic Filler Component

As the inorganic filler, any of the fillers heretofore used in the art are also suitable for use in the present invention. Thus, hydrated aluminum oxides ($Al_2O_3.3H_2O$ or $Al(OH)_3$), hydrated magnesia, hydrated calcium silicate, or hydrated zinc borate may be utilized. Additionally, I have found that hydrated calcium borate ($Ca_2B_6O_{11}.5H_2O$) provides unique properties to the composition which are highly desirable for electrical uses. That is, the use of hydrated calcium borate produces a composition having desirable elongation properties of 200% or greater while still exhibiting good tensile strength. Prior art inorganic fillers such as the hydrated aluminas produce compositions having lower elongation properties and which are more vulnerable to breaking or cracking.

The use of hydrated calcium borate as the filler produces a composition which, upon ignition, does not produce any after-glow and which forms an inorganic char which is both nontoxic and noncombustible. Hydrated calcium borate is also insoluble in water. As with other hydrated fillers, the five bound water molecules will be released upon heating endothermically, absorbing the heat needed to propagate combustion. A preferred form of calcium borate is commercially available under the designation colemanite.

For the hydrated inorganic filler component, I prefer the filler to be in particulate form, with smaller particle sizes being most preferred. Hydrated alumina is commercially available in average particle sizes as small as about 2 microns, while hydrated calcium borate is commercially available in sizes of 3.3, 5.3, or 7.3 microns.

The Proportion of Components

The amounts of polymer and filler can be varied within wide proportions. Typically the relative ratio of polymer to filler will be between from about 1:5 to 2:1. Preferably the percentage of coupling agent in the composition should be between about 0.10 to about 9.0 parts per 100 parts of polymer. Lesser amounts may be insufficient to provide adequate surface treatment, while larger quantities may have an adverse effect on the physical properties of the composition. When used as an extruded coating for wires and cables, good results may be obtained using from about 80 to 400 or more parts filler (preferably, 80–150 weight parts), 0.10 to 9.0 parts coupling agent, and 100 weight parts copolymer.

The compositions of the present invention may be formed in a number of ways. However, in every instance it is necessary that the filler and coupling agent be intimately contacted. For example, a preferred method of filler treatment is to add the coupling agent directly to the copolymer to form a mixture, followed by the addition of filler to that mixture. This can be accomplished in an internal mixer or any other processing device which is capable of producing an intimate mixture of the three components as is well known in the art. Alternatively, the coupling agent may be added directly to the filler, dispersed therein, and the polymer then added.

It will be apparent that additional optional components may be added to the compositions of the present invention. These additives include pigments (such as, for example, titanium dioxide), stabilizers, antioxidants, and lubricants as long as these components do not interfere with the crosslinking reaction or harm other desired properties of the composition. Such additives may be present in small amounts of less than about 10%, and preferably less than about 5%. Suitable antioxidants for use in the practice of the present invention include, for example, trimethyldihydroquinoline and such non-discoloring/nonstaining antioxidants as 4,4'-thiobis(6-tert-butyl-m-cresol), 4,4'-butylidenbis-(6-tert-butyl-m-cresol), and 2,2'-methylene-bis(4-methyl-6-tert butylphenol).

In order that the invention may be more readily understood, reference is made to the following examples, which are intended to be illustrative of the invention, but are not intended to be limiting in scope. Care was taken during mixing not to elevate the temperature of the mixture to a point where the peroxide crosslinking catalyst would be prematurely activated. Following mixing, aliquots of the composition were placed in a standard ASTM mold (6.0"× 6.0"×0.75") and then vulcanized.

For mixing these compositions, a state-of-the-art high-intensity internal mixer was utilized (such as commercially available Banbury-type mixers). Surprisingly, I have found that pretreatment of the filler with the coupling agent was not required in order to achieve good dispersion of the components. Such pretreatment is taught in Biggs, U.S. Pat. Nos. 4,381,362 and 4,349,605. Rather, I have found that a simple one-step mixing cycle produces adequate dispersion of the components of the composition. That is, I add a charge of polymer to the mixer, immediately followed by a charge of coupling agent. After a few minutes of mixing, I then add the charge of filler as well as any other optional ingredients. Lastly, I add a chemical crosslinking agent after checking the temperature of the mixture to insure that there is no premature vulcanization.

Such a one-step process is not only more cost effective than the prior art procedure by eliminating the need for pretreatment of any of the ingredients such as the filler, but also reduces the opportunity for weighing errors and for cross-contamination from other chemicals in the weighing and mixing area.

In order that the invention may be more readily understood, reference is made to the following examples, which are intended to be illustrative of the invention, but are not intended to be limiting in scope.

EXAMPLE 1

The following compositions were prepared by mixing the listed ingredients and then curing the compositions (at 350° F. for 20 minutes). Composition 1 represents a prior art composition using a silane coupling agent, and composition 2 contains no coupling agent; those compositions are used for comparative purposes; the compositions numbered 3–16 are compositions within the scope of the present invention. All proportions are reported as parts by weight.

| COMPOSITION NO. | 1 | 2 | 3 | 4 |
| --- | --- | --- | --- | --- |
| UE-630[1] | 100.00 | 100.00 | — | — |
| Elvax 470[10] | — | — | 100.00 | 100.00 |
| Agerite Resin D[2] | 2.00 | 2.00 | 2.00 | 0.50 |
| Atomite[3] | 2.00 | 2.00 | 2.00 | 2.00 |
| Hydral 710W[4] | 125.00 | 125.00 | 125.00 | 125.00 |
| Silane A-172[6] | 3.00 | — | — | — |
| Pigment No. 213[11] | — | — | 1.50 | 1.00 |
| VulCup 40KE[8] | 4.20 | 4.20 | 4.20 | 4.20 |
| Total Parts | 236.20 | 233.20 | 234.70 | 232.70 |

| COMPOSITION NO. | 5 | 6 | 7 | 8 |
| --- | --- | --- | --- | --- |
| Elvax 470[10] | 100.00 | — | — | 100.00 |
| Elvax 265[12] | — | 100.00 | 100.00 | — |
| Agerite Resin D[2] | 0.50 | 2.00 | 2.00 | 0.50 |
| Atomite[3] | 2.00 | 2.00 | 2.00 | 2.00 |
| Hydral 710W[4] | 125.00 | — | — | 62.50 |
| Pigment No. 33[5] | — | 150.00 | 200.00 | 62.50 |
| Adipic Acid | 1.00 | — | — | — |
| Pigment No. 88[9] | — | 1.00 | 1.00 | 1.50 |
| VulCup 40KE[8] | 4.20 | 4.20 | 4.20 | 4.20 |
| Total Parts | 232.70 | 259.20 | 309.20 | 233.20 |

| COMPOSITION NO. | 9 | 10 | 11 | 12 |
| --- | --- | --- | --- | --- |
| Elvax 470[10] | 100.00 | 100.00 | — | 100.00 |
| Elvax 265[12] | — | — | 100.00 | — |
| Agerite Resin D[2] | 0.50 | 0.50 | 2.00 | 0.50 |
| Atomite[3] | 2.00 | 2.00 | 2.00 | 2.00 |
| Hydral 710W[4] | 62.50 | — | 87.50 | 125.00 |
| Pigment No. 33[5] | 62.50 | 125.00 | 87.50 | — |
| Pigment No. 88[9] | 2.00 | 1.50 | 1.50 | 1.50 |
| VulCup 40KE[8] | 4.20 | 4.20 | 4.20 | 4.20 |
| Total Parts | 233.70 | 223.20 | 284.70 | 233.20 |

| COMPOSITION NO. | 13 | 14 | 15 | 16 |
| --- | --- | --- | --- | --- |
| Elvax 265[12] | 100.00 | 100.00 | 100.00 | 100.00 |
| Agerite Resin D[2] | 2.00 | 2.00 | 2.00 | 2.00 |
| Atomite[3] | 2.00 | 2.00 | 2.00 | — |
| Pigment No. 33[5] | 150.00 | 150.00 | 150.00 | 150.00 |
| Stearic Acid[7] | 1.50 | 1.50 | 1.50 | 1.50 |
| Pigment No. 88[9] | 0.25 | 0.50 | 0.75 | 0.25 |
| VulCup 40KE[8] | 5.00 | 5.00 | 5.00 | 5.00 |
| Total Parts | 260.75 | 261.00 | 261.25 | 258.75 |

[1]Ultrathene, a copolymer of ethylene and vinyl acetate (17% VA) from U.S.I. Chemicals Co.
[2]trimethyldihydroquinoline antioxidant
[3]calcium carbonate
[4]hydrated aluminum oxide ($Al_2O_3 \cdot 3H_2O$) from ALCOA Industrial Chemicals Division
[5]hydrated calcium borate ($Ca_2B_6O_{11} \cdot 5H_2O$), from American Borate Co. ground to an average 3.3 micron particle size
[6]vinyl-tris(2-methoxyethoxy) silane from Union Carbide
[7]from Harwick Chemical Corp.
[8]organic peroxide crosslinking agent from Hercules Powder Co.
[9]oxalic acid dihydrate
[10]a copolymer of ethylene and vinyl acetate (18% VA) from DuPont (0.7 M.I., 0.94 density)
[11]oxalic acid from American International Chemical Co.
[12]a copolymer of ethylene and vinyl acetate (28% VA) from DuPont (3.0 M.I., 0.955 density)

EXAMPLE 2

The physical properties of the compositions prepared in Example 1 were tested, and the results are shown in Table I below. As can be seen, the physical properties of compositions within the scope of the present invention compare favorably with prior art composition 1 and are superior to composition 2 (no coupling agent). An elongation percentage of 200% or greater is desirable as this is a measure of the ductility of the composition. As well, the flame and smoke behavior of the compositions of the present invention compare favorably with the prior art.

TABLE I

PHYSICAL PROPERTIES

| Composition No. | 1 | 2 | 3 | 4 | 5 | 6 | 7 | 8 |
|---|---|---|---|---|---|---|---|---|
| Tensile Strength, psi | 2996 | 1434 | 1501 | — | 1310 | — | — | 1760 |
| Elongation, % | 171 | 101 | 408 | — | 160 | — | — | 351 |
| 100% Modulus | 2446 | 1233 | 1214 | — | 1280 | — | — | 1190 |
| Aged Tensile Strength, psi | 3342 | 1764 | 1447 | — | 1490 | — | — | 1742 |
| Aged Elongation, % | 190 | 190 | 260 | — | 154 | — | — | 378 |
| Shore A Hardness | 92 | 92 | 93 | — | 94 | — | — | — |
| Shore D Hardness | 58 | 53 | 48 | — | 52 | — | — | — |
| Aged Shore A Hardness | 94 | 95 | 93 | — | | — | — | 95 |
| Aged Shore D Hardness | 58 | 57 | 48 | — | | — | — | — |

| Composition No. | 9 | 10 | 11 | 12 | 13 | 14 | 15 | 16 |
|---|---|---|---|---|---|---|---|---|
| Tensile Strength, psi | 2165 | 2195 | 1266 | 1682 | 1985 | 2127 | 1899 | 1750 |
| Elongation, % | 375 | 351 | 358 | 412 | 456 | 453 | 427 | 415 |
| 100% Modulus | 1185 | 1184 | 1118 | 1232 | 601 | 640 | 678 | 659 |
| Aged Tensile Strength, psi | 1701 | 1088 | 1587 | 1440 | 1887 | 1863 | 1680 | 1575 |
| Aged Elongation, % | 252 | 13 | 218 | 310 | 428 | 402 | 407 | 258 |
| Shore A Hardness | — | — | — | — | 92 | 91 | 92 | 92 |
| Shore D Hardness | — | — | — | — | — | — | — | — |
| Aged Shore A Hardness | 96 | 95 | 95 | 96 | 92 | 91 | 92 | 92 |
| Aged Shore D Hardness | — | — | — | — | | | | |

All tests performed using ASTM Test Methods DC-2240-91 and D-412-92; die C at 20 inches per minute; aging tests - ASTM D-573-88, 168 hrs. at 150° C.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A crosslinkable flame retardant composition comprising:
   (a) a crosslinkable silane-free polymer;
   (b) a hydrated inorganic filler which includes calcium borate pentahydrate; and
   (c) a coupling agent comprising an acid having at least two active carboxylic acid groups.

2. A crosslinkable flame retardant composition as claimed in claim 1 wherein said hydrated inorganic filler comprises calcium borate pentahydrate, hydrated zinc borate, or a mixture thereof.

3. A crosslinkable flame retardant composition as claimed in claim 1 wherein said hydrated inorganic filler comprises a mixture of calcium borate pentahydrate and hydrated aluminum oxide.

4. A crosslinkable flame retardant composition as claimed in claim 1 wherein said polymer comprises a copolymer of ethylene and vinyl acetate containing from about 6 to about 38% by weight vinyl acetate.

5. A crosslinkable flame retardant composition as claimed in claim 1 wherein said composition also includes a chemical crosslinking agent.

6. A crosslinkable flame retardant composition as claimed in claim 5 wherein said composition also includes two or more chemical crosslinking agents.

7. A crosslinkable flame retardant composition as claimed in claim 1 wherein said composition also includes an antioxidant selected from the group consisting of trimethyldihydroquinoline, 4,4'-thiobis(6-tert-butyl-m-cresol), 4,4'-butylidenbis(6-tert-butyl-m-cresol), and 2,2'-methylene-bis(4-methyl-6-tert butylphenol).

8. A flame retardant composition as claimed in claim 1 in which said composition has been crosslinked.

9. A flame retardant composition as claimed in claim 1 wherein said coupling agent is selected from the group consisting of oxalic acid, adipic acid, and mixtures thereof.

10. A crosslinkable flame retardant composition comprising:
   (a) 100 parts by weight of a silane-free polymer;
   (b) from 80–400 parts by weight of a hydrated inorganic filler which includes calcium borate pentahydrate;
   (c) from 0.10–9.0 parts by weight of a coupling agent comprising an acid having at least two active carboxylic acid groups; and
   (d) from 1–8 parts by weight of a chemical crosslinking agent.

11. A crosslinkable flame retardant composition as claimed in claim 10 wherein said hydrated inorganic filler comprises calcium borate pentahydrate, hydrated zinc borate, or mixtures thereof.

12. A crosslinkable flame retardant composition as claimed in claim 10 wherein said hydrated inorganic filler comprises a mixture of calcium borate pentahydrate and hydrated aluminum oxide.

13. A crosslinkable flame retardant composition as claimed in claim 10 wherein said composition also includes an antioxidant selected from the group consisting of trimethyldihydroquinoline, 4,4'-thiobis(6-tert-butyl-m-cresol), 4,4'-butylidenbis(6-tert-butyl-m-cresol), and 2,2'-methylene-bis(4-methyl-6-tert butylphenol).

14. A flame retardant composition as claimed in claim 10 in which said composition has been crosslinked.

15. A crosslinkable flame retardant composition consisting of:

(a) a crosslinkable polymer;

(b) calcium borate pentahydrate; and (c) a coupling agent.

16. A crosslinkable flame retardant composition as claimed in claim 1 wherein said hydrated inorganic filler further comprises hydrated aluminum oxide and said coupling agent comprises oxalic acid dihydrate.

17. A crosslinkable flame retardant composition as claimed in claim 1 wherein said coupling agent comprises oxalic acid dihydrate.

18. A crosslinkable flame retardant composition consisting of:

(a) a crosslinkable silane-free polymer;

(b) a hydrated inorganic filler;

(c) a coupling agent comprising an acid having at least two active carboxylic acid groups; and (d) calcium carbonate.

19. A crosslinkable flame retardant composition consisting of:

(a) 100 parts by weight of a silane-free polymer;

(b) from 80–400 parts by weight of a hydrated inorganic filler;

(c) from 0.10–9.0 parts by weight of a coupling agent comprising an acid having at least two active carboxylic acid groups;

(d) from 1–8 parts by weight of a chemical crosslinking agent; and (e) calcium carbonate.

20. A crosslinkable flame retardant composition as claimed in claim 15 wherein said coupling agent comprises stearic acid.

21. A crosslinkable flame retardant composition as claimed in claim 1 further including calcium carbonate.

* * * * *